United States Patent [19]

Deeter

[11] Patent Number: 5,685,382

[45] Date of Patent: Nov. 11, 1997

[54] QUADRAPOD AUGER SUPPORT

[75] Inventor: Ronald C. Deeter, Coshocton, Ohio

[73] Assignee: Brydet Development Corp., Coshocton, Ohio

[21] Appl. No.: 636,278

[22] Filed: Apr. 29, 1996

[51] Int. Cl.[6] .................................................. E21B 10/44
[52] U.S. Cl. ..................................... 175/394; 175/122
[58] Field of Search ............................... 175/394, 323, 175/53, 122

[56] References Cited

U.S. PATENT DOCUMENTS

| | | | |
|---|---|---|---|
| 693,801 | 2/1902 | Leaverton | 175/394 |
| 1,086,748 | 2/1914 | Braasch | 175/394 |
| 1,729,211 | 9/1929 | Erisman . | |
| 2,298,332 | 10/1942 | Applegate . | |
| 2,709,572 | 5/1955 | Ageborn | 175/394 |
| 2,751,203 | 6/1956 | Compton | 175/394 |
| 2,783,974 | 3/1957 | Veasman | 175/394 |
| 2,839,271 | 6/1958 | Kandle | 175/394 |
| 2,887,300 | 5/1959 | Meredith | 175/394 |
| 3,012,371 | 12/1961 | Pawela . | |
| 3,830,318 | 8/1974 | Busby et al. | 175/122 |
| 4,220,242 | 9/1980 | Forsberg . | |
| 4,364,469 | 12/1982 | Rudolpj . | |
| 5,318,444 | 6/1994 | Kuzub et al. . | |
| 5,358,062 | 10/1994 | Uhl et al. | 175/394 |

*Primary Examiner*—Frank Tsay
*Attorney, Agent, or Firm*—Frederic E. Naragon

[57] ABSTRACT

In an augering apparatus for rotating and advancing a cutting head longitudinally of the apparatus driven by a string of auger flights with helical flighting, an auger flight support comprising a plurality of radially extending support legs affixed to a bearing housing surrounding a bearing rotatably affixed to the auger drive shank disposed at one end of a two-ended auger flight to support the auger flight independently of the support provided by the auger flighting to reduce wear and tear of the helical flighting and to eliminate frictional drag of the string of auger flights.

4 Claims, 2 Drawing Sheets

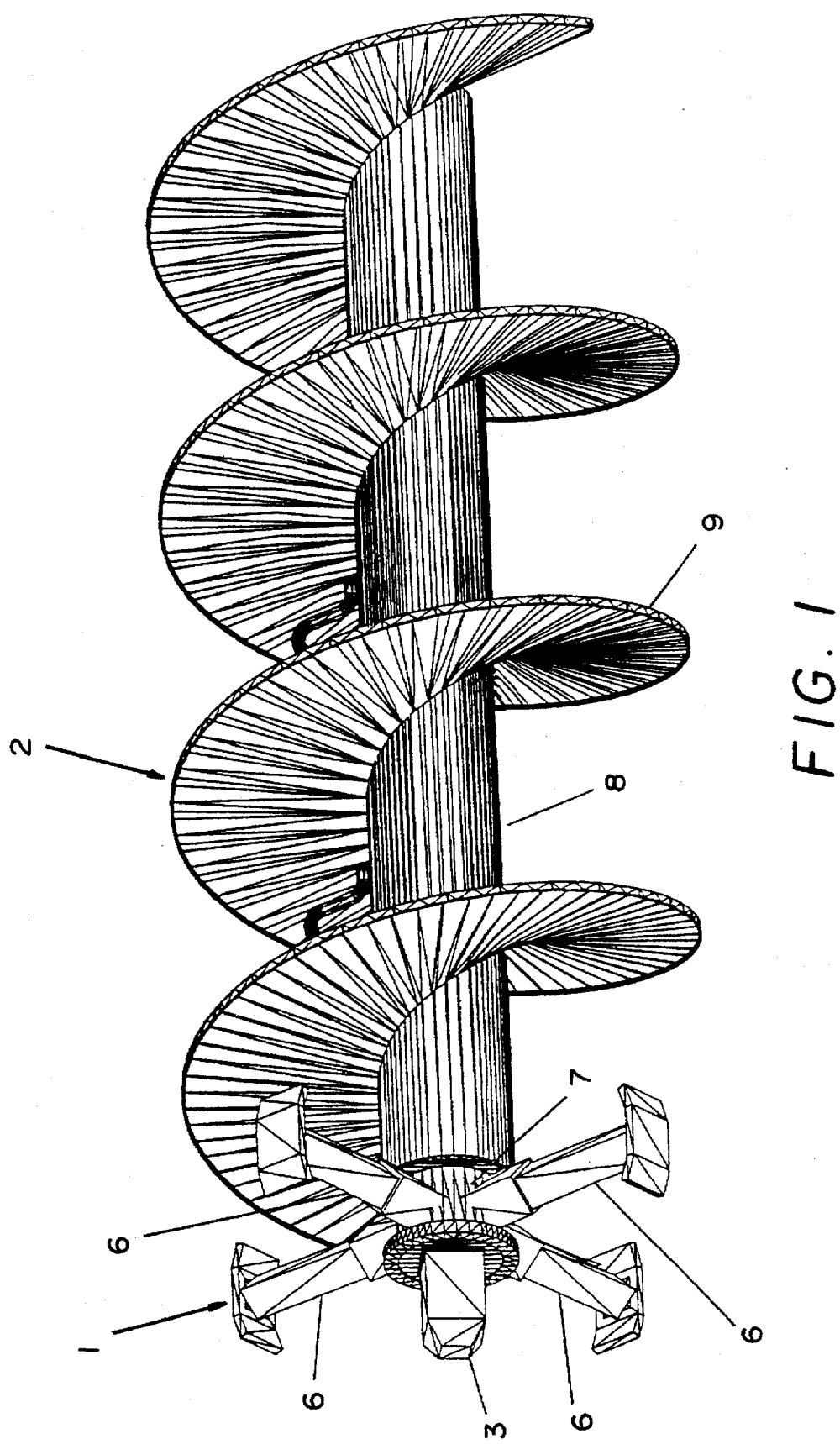
FIG. I

QUADRAPOD AUGER SUPPORT

BACKGROUND OF THE INVENTION AND SUMMARY OF THE INVENTION

The present invention relates generally to a quadrapod auger support mechanism primarily as an improvement to an auger apparatus of the type that bores deep, laterally extending holes into minable material in the earth by an auger formed by a string of connected, helically vaned sections known in the industry as auger flights, and more particularly to an auger apparatus for the mining of coal and other minable materials.

The present invention relates generally to a plurality of support legs mounted on a low friction bearing to be mounted on each auger flight in the string and is slightly larger in diameter than the helical flighting of the auger which results in the auger string being supported by the present invention rather than by the helical flighting of the auger flight and thus reducing frictional drag which is a major consumer of horse power.

The invention provides exceptional advantages when employed in auger mining machines in that three major requirements that consume horse power on an augering machine are horse power to convey, friction drag horse power to rotate the auger string, and remaining horse power to cut the minable materials. The present invention reduces the horse power necessary to rotate the auger string and production is increased and is more economical because the present invention supports the auger flights independently of the support provided by the helical flights of the auger flight in a string. Auger mining machines generally comprise an auger embodying a cutting head of selected diameter connected to and rotatably driven by a string of end-connected, helically vaned auger sections known as auger flights, driven from the machine by being rotated and urged longitudinally of the auger. The cutting head penetrates the material being mined, and the material is transported rearwardly from the cutting head along the auger string by the vanes of the auger flights out of the hole cut by the cutting head to a conveyor on the machine by which the material is removed.

As the cutting head is caused to penetrate into the hole, it is necessary to introduce additional auger flights into the string until the desired length of the auger string is reached to achieve the desired depth of the hole. As additional auger flights are introduced into the string the weight of each additional auger flight causes frictional drag based on the weight of the auger string and as each additional auger flight is added to the string, additional horse power is required to rotate the auger string because of the increased frictional drag. The present invention provides independent support to each auger flight in the string reducing the frictional drag and increasing horse power to rotate the auger string and allowing the mining operation to be more economical and profitable. In addition, the support provided by the present invention further reduces wear and tear on the auger flighting thus reducing maintenance and increasing the longevity of the life of the auger flight.

In general the present invention comprises a plurality of radially extending legs mounted to a bearing housing disposed on one end of the auger flight. A low friction bearing surrounded by the bearing housing is rotatably secured to the auger flight resulting in the weight of the auger flight being substantially removed from the auger flight string and transferred to the support legs of the present invention. The auger flight drive shank rotates freely within the bearing of the present invention.

The prior art discloses patents for augering machines and improvements to augering apparatus and some of the patents are listed as follows:

| | |
|---|---|
| U.S. Pat. 1,729,211 - J. L. Erisman | Sept. 24, 1929 |
| U.S. Pat. 2,298,332 - L. J. Applegate | Oct. 13, 1942 |
| U.S. Pat. 3,012,371 - A. C. Pawela | Dec. 12, 1961 |
| U.S. Pat. 4,220,242 - George L. K. Forsberg | Sept. 2, 1980 |
| U.S. Pat. 4,364,469 - Siegfried Rudolph | Dec. 21, 1982 |
| U.S. Pat. 5,318,444 - Danny S. Kuzub et al. | June 7, 1994 |

U.S. Pat. No. 1,729,211 issued to J. L. Erisman on Sep. 24, 1929, pertains to an improvement to a screw conveyor to minimize destruction of bearings caused by material pile-up at the bearing points and further illustrates a support bracket mounted to the screw conveyor for support of the screw conveyor. The invention does not teach a plurality of support legs extending radially from the screw conveyor as provided by the present invention.

U.S. Pat. No. 2,298,332 issued to L. J. Applegate on Oct. 13, 1942, illustrates a grain removal auger which includes a ring mounted on the outboard end of the auger of larger diameter than the auger and prevents the auger from touching the ground. The invention is operable in a fixed position and does not teach of adding additional auger flights in a string and the horizontal movement of such string and further does not teach of a plurality of support legs radially extending from the auger flights as is provided in the present invention.

U.S. Pat. No. 3,012,371 issued to A. C. Pawela on Dec. 12, 1961, illustrates a banker and sprayer for banking earth around a tree or plant which includes a shaft and screw contained within a fixed housing and supported by bearings at each end of the shaft and screw. This invention does not teach of the adding of additional auger flights end to end and the longitudinal movement of such auger flights and a plurality of support legs extending radially to support the auger flights as is provided in the present invention U.S. Pat. No. 4,220,242 issued to George L. K. Forsberg on Sep. 2, 1980, provides for a screw conveyor and includes at least one arm extending between the shaft and the drum of the invention wherein the arm encompasses paddles, shovels, sickles, buckets and the like for the purpose of avoiding a build-up of the materials being moved along the shaft and screw. The invention does not provide for a plurality of radially extending legs from a helically vaned auger flight to be moved longitudinally of the auger and to provide support for the auger flight and the adding of additional auger flights in a string as is provided in the present invention.

U.S. Pat. No. 4,364,469 issued to Siegfried Rudolph on Dec. 21, 1982, provides for a screw conveyor assembly used in pumping of waste water and includes a stationary cylindrical jacket with a screw conveyor mounted within the jacket and supported at the bottom end by an "L" shaped lever to minimize bending and distortion of the jacket and screw. The invention does not teach of a plurality of supporting legs extending radially from a helically shaped auger flight or support of the auger flight as is provided in the present invention.

U.S. Pat. No. 5,318,444 issued to Danny S. Kuzub, et al. on Jun. 7, 1994, provides for a grain storage unloading system which includes an auger within a discharge tube wherein the auger is supported by a hanger bearing which extends outwardly from a central sleeve which is mounted on a bushing. The fingers hold the auger away from the walls of the tube. Although the invention teaches the general idea of support by a plurality of radially extending fingers, the invention does not teach of radially extending support legs for helically shaped auger flights moving longitudinally to the auger in a string of such flights as is provided in the present invention.

BRIEF DESCRIPTION OF THE DRAWINGS

FIG. 1 shows a perspective view of the present invention in position on an auger flight.

Figure 2B:
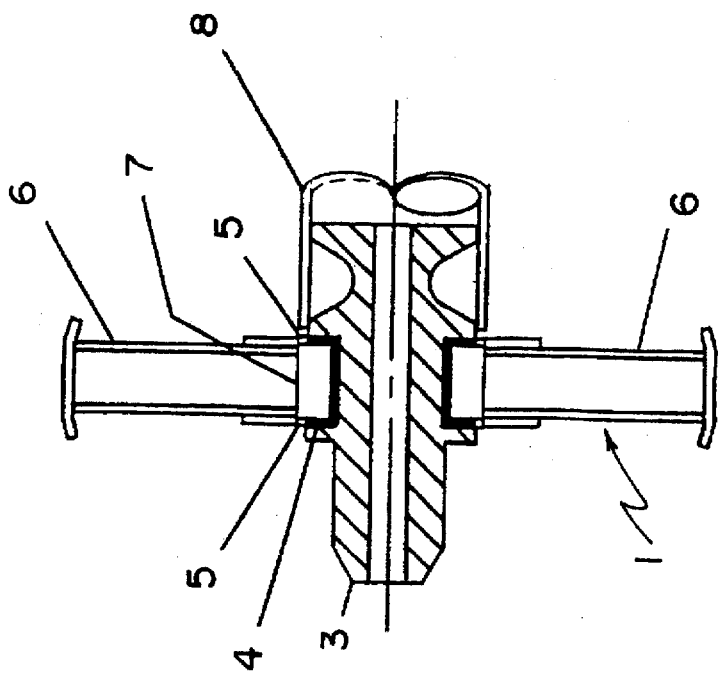
FIG. 2B is a section view of the present invention along line A—A of FIG. 2A.

ABSTRACT OF THE DRAWINGS 1 is the present invention;

2 is an auger flight;

3 is an auger drive shank;

4 is a bearing;

5 is a bearing seal;

6 is a support leg;

7 is a bearing housing;

8 is an auger tube;

9 is helical flighting.

DETAILED DESCRIPTION OF THE DRAWINGS

Reference is now made to the drawings wherein the present invention is illustrated in detail and wherein similar components bear the same reference numeral throughout the several views FIG. 1 shows a perspective view of the present invention 1 in position on an auger flight 2. The auger drive shank 3, support legs 6, bearing housing 7, auger tube 8, and helical flighting 9 are further illustrated.

Figure 2A:
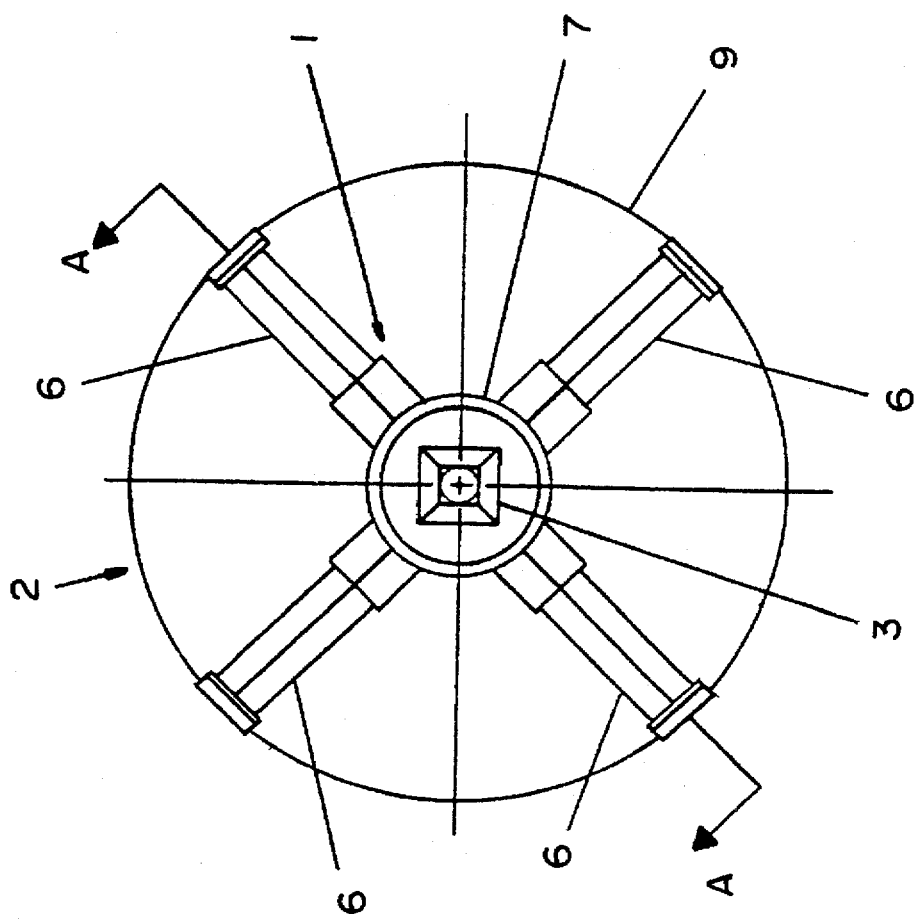
FIG. 2A is an end view of the present invention in position on an auger flight.

FIG. 2A shows an end view of the present invention 1 in position on an auger flight 2 and further illustrates support legs 6, bearing housing 7, auger drive shank 3, and auger flighting 9.

FIG. 2B is a section view along line A—A from FIG. 2A and illustrates the present invention 1, auger drive shank 3, bearing 4, bearing seal 5, support legs 6, bearing housing 7, and auger tube 8.

DESCRIPTION OF THE PREFERRED EMBODIMENT

Referring to FIGS. 1 through 2A the preferred embodiment of the present invention comprises a plurality of support legs extending radially from a bearing housing which surrounds a bearing rotatably affixed on an auger drive shank of an auger flight wherein the ideal number of support legs is four (4) and the legs are of predetermined length slightly larger than the diameter of the helical flighting of the auger flight and wherein the support legs are affixed to a split bearing housing surrounding a split bearing and a split bearing seal is disposed between the bearing housing and bearing and wherein the present invention is affixed rotatably to one end of a two ended helically shaped auger flight. The auger drive shank rotates freely within the bearing.

Although the invention has been described in preferred form with a certain degree of particularity, it is understood that the present disclosure of the preferred form has been made only by way of example and numerous changes in the details of construction and the combination arrangement of parts may be resorted to without departing from the spirit and scope of the invention as hereinafter claimed.

What is claimed is:

1. In an augering apparatus for rotating and advancing a cutting head driven longitudinally of the auger by a string of two-ended auger flights having helical flighting, the improvement of an auger flight support adapted to support at one end auger flight with helical flighting and comprises:

A bearing rotatably affixed to an auger drive shank at one end of an auger flight with two ends;

A bearing housing surrounding the bearing and adapted to accept a plurality of support legs extending radially from the bearing housing and the drive shank of the auger flight;

A plurality of support legs extending radially from the bearing housing to a predetermined length;

A bearing seal disposed between the bearing housing and bearing.

2. The auger flight support of claim 1 wherein the diameter formed by the radial extension of the support legs is slightly larger than the diameter of the helical flighting of the auger flight.

3. The auger flight support of claim 1 wherein the number of support legs is three (3).

4. The auger flight support of claim 1 wherein the number of support legs is four (4).

* * * * *